No. 624,929. Patented May 16, 1899.
W. H. HANSON.
TYPE WRITER.
(Application filed Jan. 15, 1898.)
(No Model.) 6 Sheets—Sheet 1.

Witnesses:
Geo N Young,
B. C. Roloff.

Inventor:
Walter H. Hanson,
By H. G. Underwood.
Attorney.

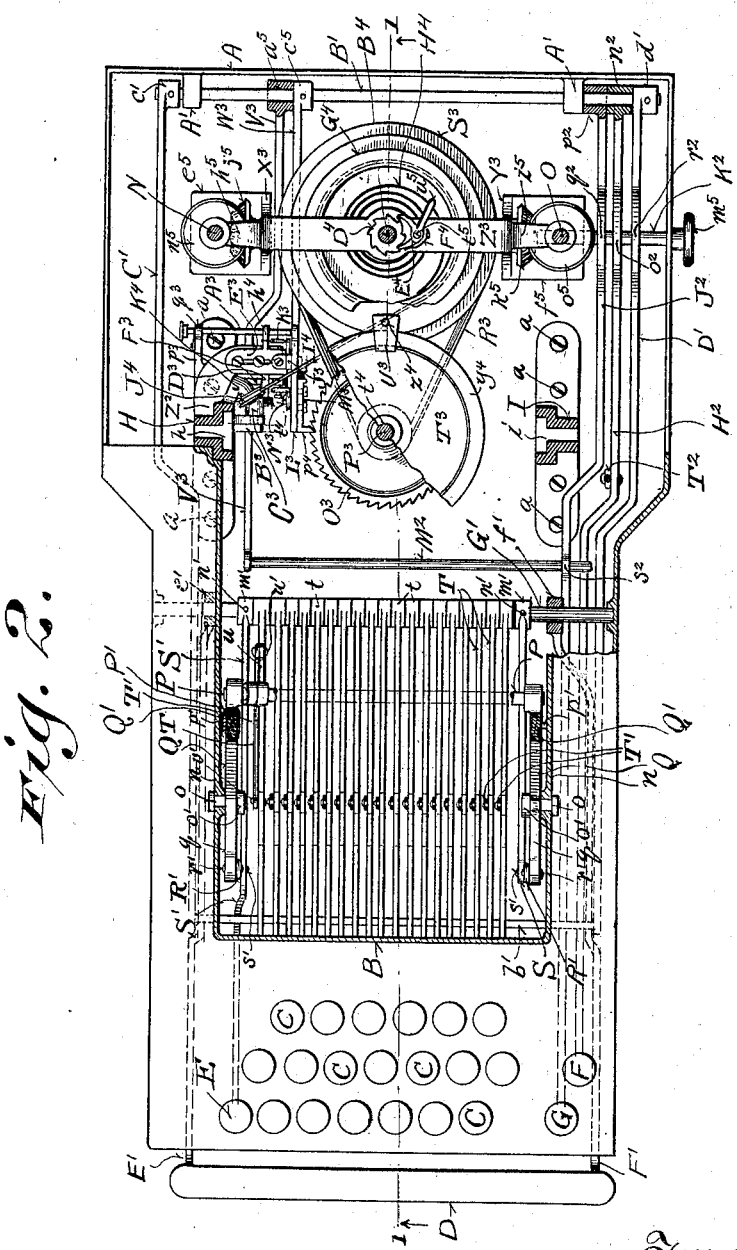

No. 624,929. Patented May 16, 1899.
W. H. HANSON.
TYPE WRITER.
(Application filed Jan. 15, 1898.)
(No Model.) 6 Sheets—Sheet 3.

Witnesses
Geo. W. Young.
B. L. Roloff.

Inventor:
Walter H. Hanson.
By H. G. Underwood
Attorney

No. 624,929. Patented May 16, 1899.
W. H. HANSON.
TYPE WRITER.
(Application filed Jan. 15, 1898.)
(No Model.) 6 Sheets—Sheet 5.
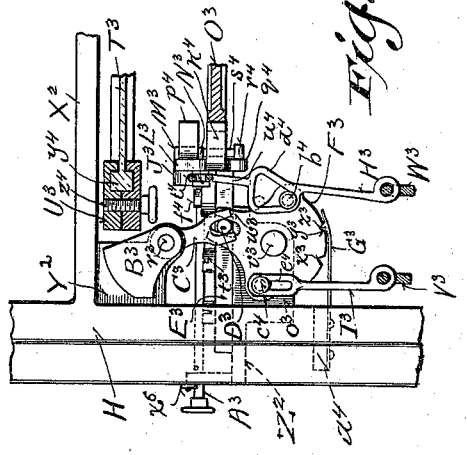
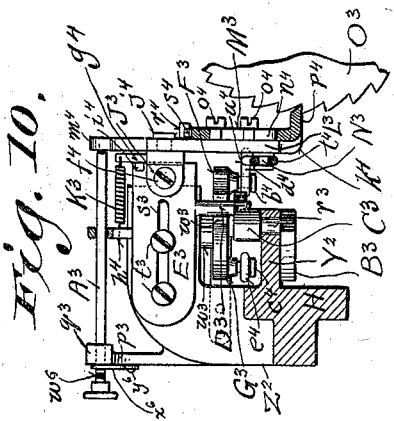
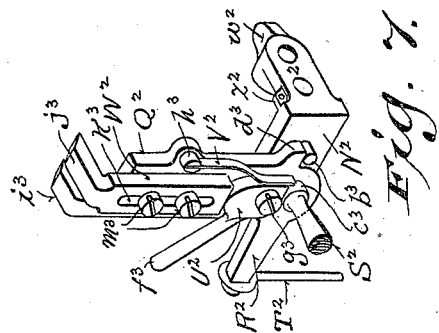
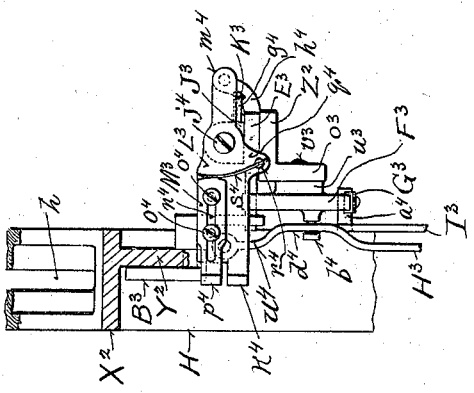
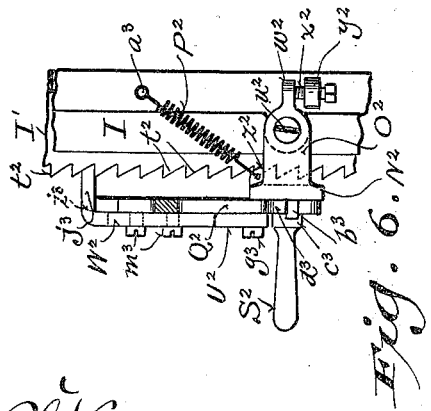
Witnesses:
Geo. W. Young,
B. C. Roloff.
Inventor:
Walter H. Hanson
By H. G. Underwood
Attorney No. 624,929. Patented May 16, 1899.
W. H. HANSON.
TYPE WRITER.
(Application filed Jan. 15, 1898.)

(No Model.) 6 Sheets—Sheet 6.

Witnesses:
Geo. W. Young
B. C. Roloff

Inventor:
Walter H. Hanson
By H. G. Underwood
Attorneys

UNITED STATES PATENT OFFICE.

WALTER H. HANSON, OF MILWAUKEE, WISCONSIN, ASSIGNOR TO ANTONIA HANSON AND OLE H. LEE, OF SAME PLACE.

TYPE-WRITER.

SPECIFICATION forming part of Letters Patent No. 624,929, dated May 16, 1899.

Application filed January 15, 1898. Serial No. 666,776. (No model.)

*To all whom it may concern:*

Be it known that I, WALTER H. HANSON, a citizen of the United States, and a resident of Milwaukee, in the county of Milwaukee and State of Wisconsin, have invented certain new and useful Improvements in Type-Writers; and I do hereby declare that the following is a full, clear, and exact description thereof.

My invention relates to the class of typewriting machines which employ keyboards, type-bars connected to the key-levers, and ribbons for the type-bars to strike against, the platen in my device being arranged vertically; and it consists in certain peculiarities of construction and combination of parts, as will be fully set forth hereinafter and subsequently claimed.

Figure 1:
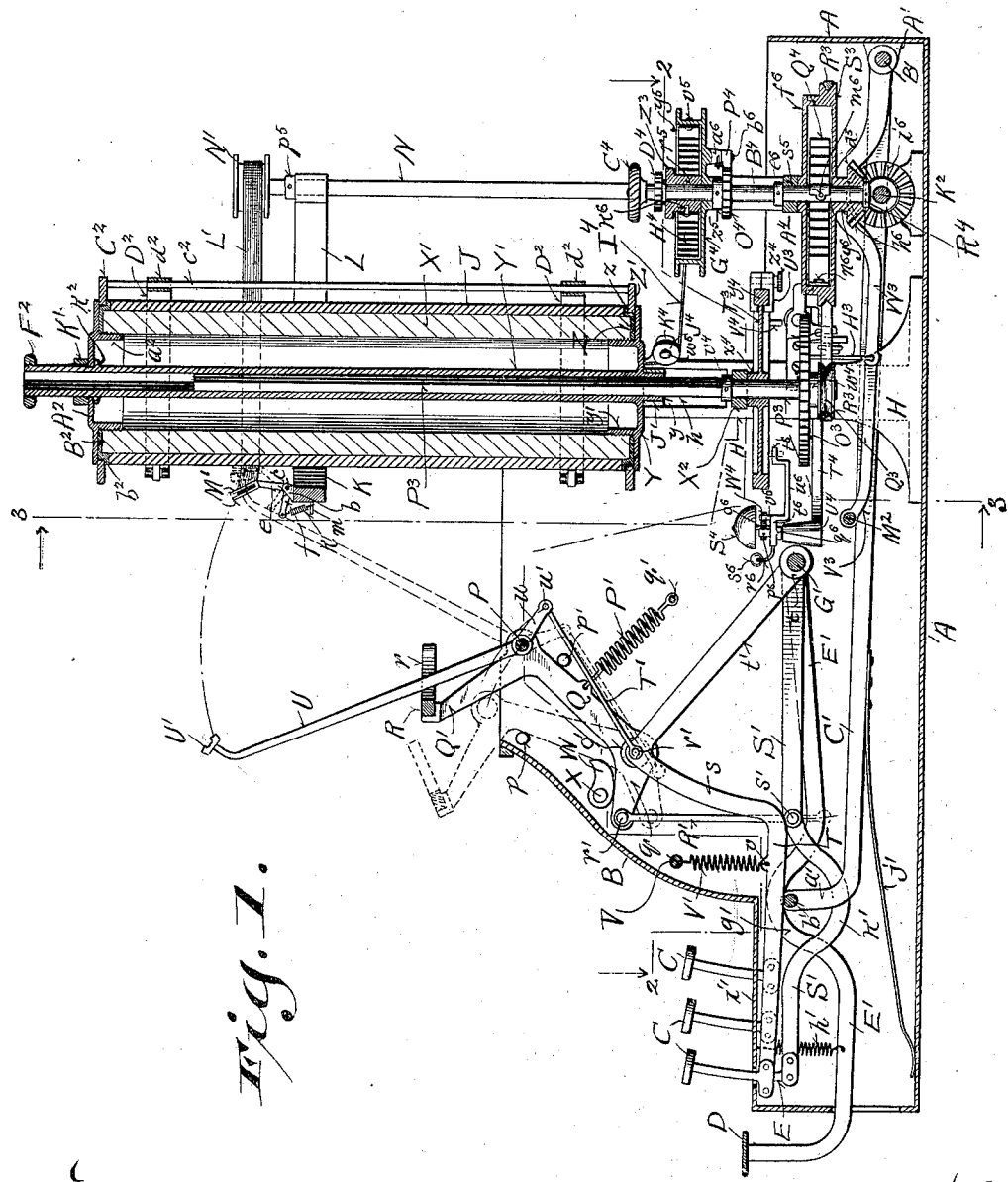
Figure 4:
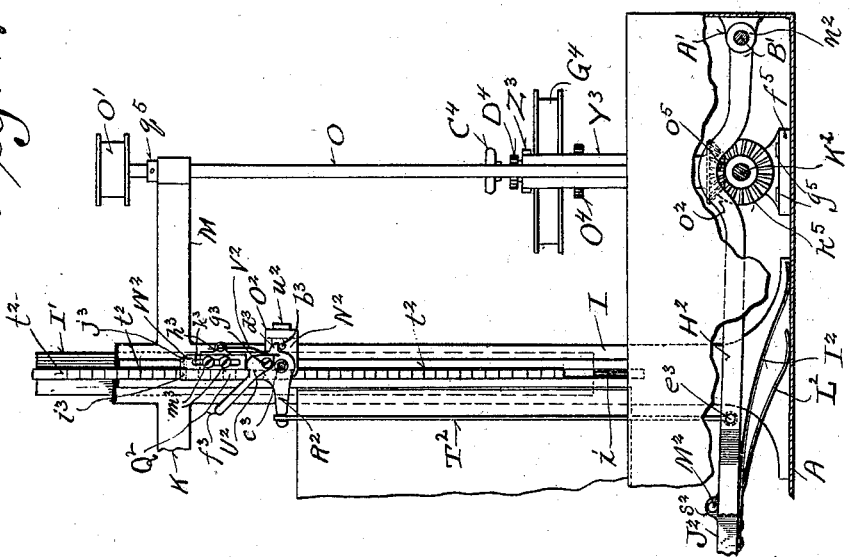
Figure 3:
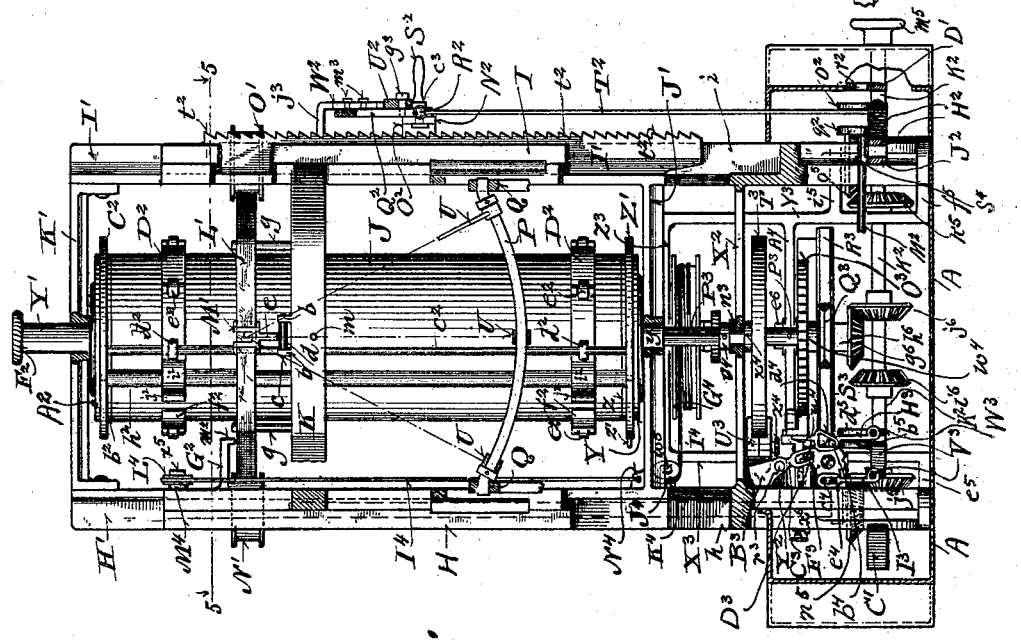
Figure 5:
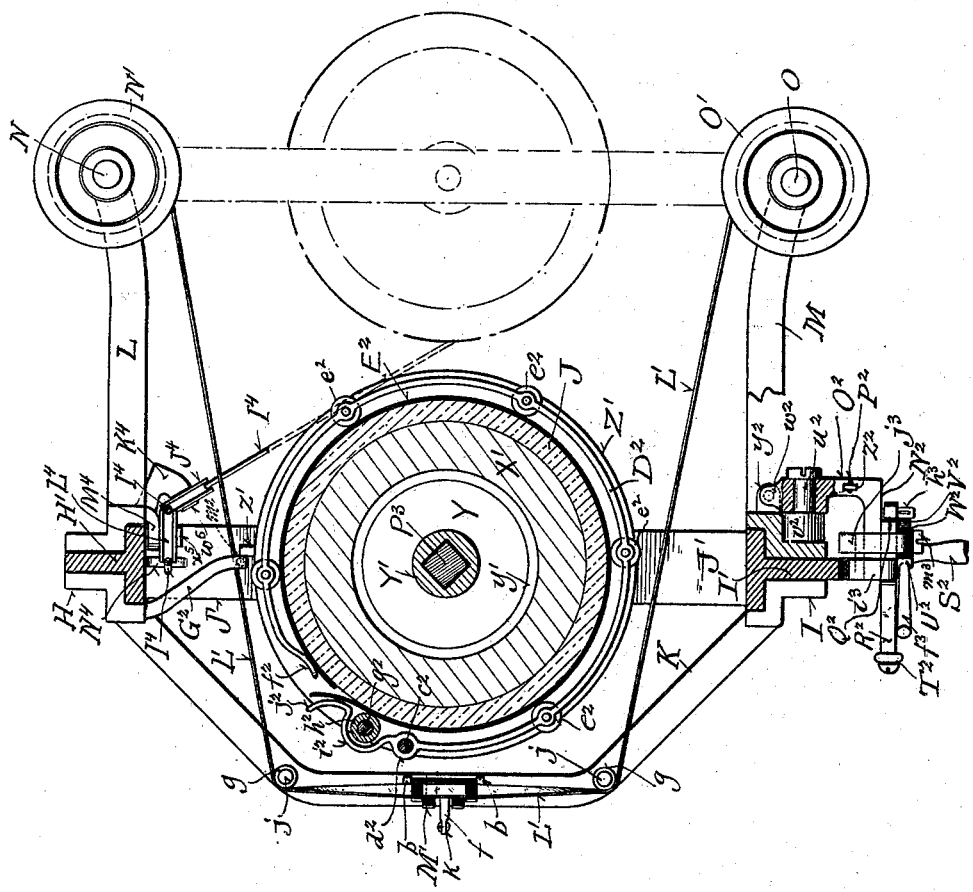
Figure 11:
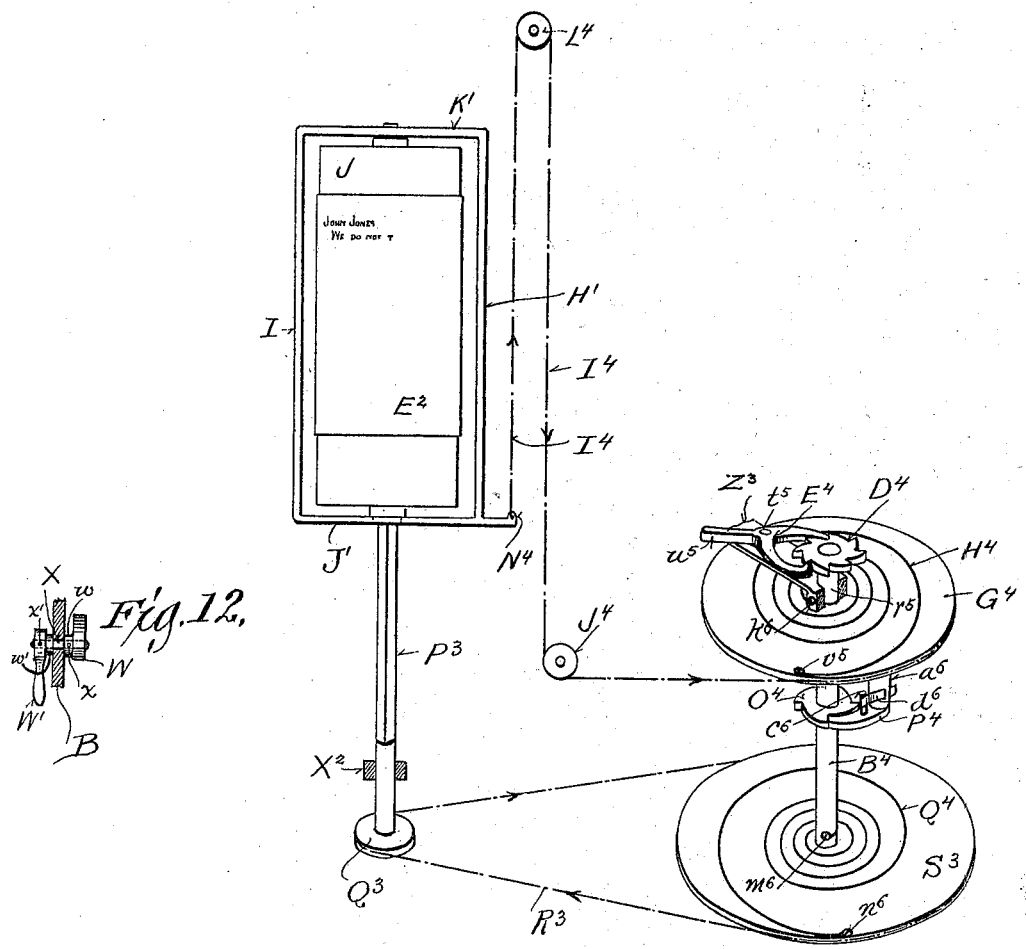
Figure 12:
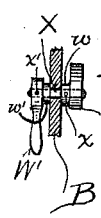

In the drawings, Figure 1 is a vertical central longitudinal section on the plane indicated by the line 1 1 of Fig. 2. Fig. 2 is a horizontal sectional view on the planes indicated by the line 2 2 of Fig. 1, with the typebars, shift-lever lock, and key-lever springs and connecting parts omitted. Fig. 3 is a vertical sectional view on the plane indicated by the line 3 3 of Fig. 1. Fig. 4 is a detail view of the line-spacing mechanism, shown in elevation. Fig. 5 is a sectional view on line 5 5 of Fig. 3, drawn to an enlarged scale. Figs. 6 and 7 are detail views of the line-spacing mechanism. Figs. 8, 9, and 10 are detail views of the letter-spacing mechanism. Fig. 11 is a partly diagrammatic and partly detail perspective view of the platen-operating mechanism. Fig. 12 is a detail view of the shift-lever lock.

Referring to the drawings, A represents the lower part of the frame of the machine, and B the upper front portion of said frame, which frame not only serves as the base or support of the machine, but also as a casing for the key-levers and their operating mechanism. In the machine illustrated in the present drawings I have shown only nineteen typekeys C C C, arranged in three banks, and each type-bar is constructed to have two characters thereon, whereby thirty-eight characters are provided for; but it will be understood that any required number of type-bars may be employed, and the form of machine best adapted for ordinary office use is provided with thirty-eight keys arranged in four banks, thereby providing for seventy-six characters; but I have illustrated, as stated, a machine provided with only one-half of the usual number of type-keys to avoid useless duplication of parts in the drawings.

D represents the spacer-bar; E, the shiftkey; F, the platen-raising key, and G a key called for the sake of brevity the "marginkey," the construction, arrangement, and function of these various keys and their attachments being hereinafter fully explained.

H I represent the vertical standards of the cylinder or platen J, around which platen the sheet of paper to be type-written on is wrapped, as hereinafter described. K is a yoke-shaped cross-piece connecting the said standards H I at some little distance below their tops, the feet or bases of said standards being secured in any preferred manner, as by screws $a$ $a$, to the base of the frame A. Each standard H I is formed with a vertical T-shaped groove (marked $h$ and $i$, respectively) to receive the correspondingly-shaped side bars H' and I' of the platen-supporting slide, said side bars being united near their base by a cross-bar J' and at their top by another cross-bar K'. In line with the ends of the yoke-shaped cross-piece K are two rearward-extending arms L M, projecting from the standards H I, respectively, and terminating in vertical bearings for the vertical shafts N O of the ribbon-spools N' O'.

A' A' are lugs projecting inwardly from the rear end of the lower part A of the frame and are transversely bored to form bearings for a transverse shaft B', to the extreme ends of which shaft are rigidly secured the enlarged rear ends $c'$ $d'$ of the levers C' D', whose forward ends rise abruptly, as shown at $a'$, Fig. 1, and are united by a cross-bar $b'$. To each end of the described spacer-bar D are secured the upwardly-bent forward ends of levers E' F', whose rear ends are enlarged into hubs $e'$ $f'$, which are journaled on the transverse shaft G', which is itself journaled in the side pieces of the frame A. These levers E' F' are each formed with a rounded bend at about the centers thereof, as shown at $g'$, Fig. 1, which bent portions straddle and rest on the hereinbefore-named front-end cross-bar $b'$ of the levers C' D', and each lever E' and F' is connected by a spiral retracting-spring h' to the keyboard proper, i', while the other levers C' D' are retracted by means of flat springs j', whose free forward ends rest on the base of the frame A, all as shown in Fig. 1 with respect to the levers C' E', the springs of the other levers F' D' (not shown in said figure) being identical in construction and arrangement.

L' represents the ribbon, whose ends are wound around the spools N' O', and M' is what I term the "ribbon-holder," whose construction and arrangement are shown in detail in Figs. 1, 3, and 5 and are as follows: The yoke-shaped cross-piece K has at its center two upward lugs b b, perforated to form bearings for the pivot c, passed therethrough, and on this pivot c, between the said lugs b b, there is mounted a sleeve d, which forms the center of a bell-crank lever e f, and from the upper arm e of the said bell-crank lever there projects the said ribbon-holder M', the same having two pairs of tongues or forks, between which the ribbon L' is held, as clearly shown in the three figures of the drawings just named, said ribbon also passing around vertical antifriction-sleeves g g, which revolve on studs or pins j j, projecting up from the top of the said cross-piece K, at about the ends of the straight central portion thereof, as best shown in Fig. 5, from which points the said ribbon goes directly to the said ribbon-spools N' O'. The ribbon-holder M' is kept normally away from contact with the platen J (or the sheet of paper thereon) and retracted (after it has been carried back to such contact by a type-bar, as hereinafter explained) by means of a spring K, secured to the front end of the lower arm f of the described bell-crank lever and to a pin m, projecting from the front center of the described cross-piece K.

P represents an arc-shaped rod, whose ends are held in the upper ends of the long arms Q Q of the bell-crank shift-levers Q q Q q, on which rod P and between said arms Q Q all of the type-bars are pivotally arranged, as hereinafter described. These bell-crank levers Q q are pivoted, one on each side, to the side pieces of the upper part B of the frame or casing on the inner sides thereof, as shown by the lugs or bearings n n and pivot-bolts o o, as shown in Fig. 2, the inner heads o' of said pivot-bolts being shown in said figure and one of them being also shown in Fig. 1, in which last-named view only the left-hand shift-lever or that nearest the shift-key E is shown, and the shift-lever on this said left-hand side is provided with a retracting-spring P', secured to the arm Q of the lever and to a pin q', projecting from the inner surface of the left-hand side piece of the said upper frame or casing B, while the movement of both of the shift-levers Q q is limited by stops or pins p p', projecting inwardly from the said side pieces of the frame or casing B, as most clearly shown with reference to the stops on one side in Fig. 1, said stops being duplicated on the other side of the said frame or casing.

Q' is a post projecting obliquely forward from near the upper end of the arm Q of each shift-lever Q q, and to the tops of said oblique posts there is secured a transverse bar R, having right-angled ends r extending toward the rear of the machine. This bar may be brazed, screwed, or otherwise secured in position on the upper ends of the said posts Q', this being immaterial so long as the parts are rigidly united together, and, if desired, the said ends r may be formed integrally with the levers Q q and posts Q' and the bar R be simply a straight transverse rod.

S S' represent two levers operated by the shift-key E. The lever S', at its forward end, is connected directly to the lower end of the shank of said shift-key E and farther back is bent into a downward rounded curve, as shown at k', (so as to pass under the described cross-bar b' of the levers C' D',) and thence straight on backward to the described transverse shaft G', to which its enlarged rear end is rigidly secured near one end of said shaft, all as shown in Figs. 1 and 2, the said rear end being in the form of a sleeve or hub m', through which a pin n' is driven into the said shaft G'. R' is a link pivotally connecting the extreme forward end of the short arm q of the bell-crank shift-lever Q q to this said shift-key lever S', just beyond the described curve or bend k' in said lever, by the pivots r' s', this said shift-key lever S' being on the left-hand side of the machine in the construction illustrated in the present drawings, because the shift-key E is shown as being on that side. On the opposite side of the machine is the lever S, which, as shown in Fig. 2, only extends as far forward as the end of the short arm q of the lever Q q on that side, to which short arm the said forward end of the lever S is pivotally connected by another link R' and pivots r' s', the rear end of this lever S terminating, like the just-described lever S', in a hub or sleeve m', slipped on the transverse shaft G', adjacent to its other end, and secured in place thereon by a like pin n'.

T T T represent the key-levers, connected at their forward ends to the lower ends of the shanks of the type-keys C C C and at their rear ends terminating in sleeves or hubs t t t, which are slipped on the described transverse shaft G' between the sleeves or hubs m' m' of the shift-key levers S S'. One of these key-levers T is shown in detail in Fig. 1, where the front straight part bears said reference-letter T, there being a curved upwardly and rearwardly extending intermediate part s and a straight oblique downward rear part t', terminating in the described sleeve or hub t. The straight forward part of each key-lever T rests on the described front cross-bar b' of the levers C' D'.

U U U represent the type-bars, and one of the same is also fully illustrated in Fig. 1. Each type-bar is, near its lower end, slightly enlarged and there provided with a transverse opening, (whereby the said type-bars are strung upon the hereinbefore-named arc-shaped rod P,) and beyond this the said type-bar terminates in an obliquely-disposed foot $u$, which latter is pivotally connected, by a link T', to its key-lever T, the upper pivot being shown at $u'$, at the end of the foot $u$, and the lower pivot being shown at $v'$, at the apex of the upward-extending portions $s$ and $t'$ of the key-lever T. The upper free end of the type-bar U is bent rearwardly and upwardly and fitted with a plate U', bearing two characters, one above the other, the faces of the said characters slanting in opposite directions, as shown in Fig. 1. These type-bars U U are all strung on the rod P, and the object in having the said rod arc-shaped is so that each type-bar will strike at exactly the same place—viz., through the front center of the ribbon-holder M', between the front fork or front pair of tongues thereof, as indicated by the broken or dotted lines in Fig. 3.

V is a transverse rod extending across the front portion of the machine from side to side of the upper frame or casing B just back of the front portion of said frame or casing, and V' represents a spiral retracting-spring whose upper end is secured to said rod V and whose lower end is secured to a loop or eye $v$ on the key-lever T beneath, there being one of these springs to each key-lever, so that the said lever may be instantly retracted to its normal position after it has been depressed. One of these springs, with the rod V in section, is shown in Fig. 1; but this showing is omitted in Fig. 2, together with the series of type-bars U U, to avoid confusion in the drawing, which simply shows at this place the key-levers T T and portions of connected mechanism.

The preferred arrangement of characters on the plates U' of the type-bars U is that common to type-writing machines which employ a shift—viz., the upper character is the "capital" letter and the lower character is the corresponding "lower-case" letter, with the usual arrangement of figures and punctuation-marks, &c.—and I lay no claim to that arrangement; but, so far as I know, making the faces of the upper and lower characters on each plate slant in opposite directions is new with me, the object being to have each character at its impact with the ribbon (when the latter is against the paper on the platen) stand exactly vertical and give a direct horizontal impression, whether the type-bar is in its normal position, so that the lower character will strike, or shifted, so that the upper character will strike. It is sometimes desirable to continuously use the upper characters exclusively for an extended length of time, as in making headings of letters or circulars, &c., and to facilitate this I employ the shift-lever lock. (Shown best in the detail view, Fig. 12.) The locking-cam of this device is also shown in Fig. 1; but in Fig. 2 I have omitted any showing of this device, which would otherwise confuse the view of the shift-lever Q $q$ on the left-hand side of the machine.

W represents the locking-cam of the shift-lever lock, which cam is cast rigidly with a sleeve or collar $w$, these parts being located on the inner side of the left-hand side piece of the upper frame or casing B, so that the said cam is in vertical line with the short arm $q$ of the shift-lever Q $q$ on that side, said part W $w$ being made rigid, as by pin $x$, with the inner projecting end of a shaft X, which is journaled in said side piece of the frame B, while W' represents a finger, having a sleeve or collar $w'$ rigid therewith, mounted on the outer projecting end of said shaft X and there secured, as by pin $x'$, all as best shown in the said detail view Fig. 12, the cam W and finger W' of the device projecting at practically right angles to each other, so that by pulling on the finger W' and drawing it forward from a practically vertical to a practically horizontal position the said locking-cam W will bear down on the short arm $q$ of the shift-lever Q $q$ on that side, shifting said lever against the force of its spring P', and thereby not only accomplish the shift without the need of touching the shift-key E, but also lock the lever in the shifted position, (shown in dotted lines in Fig. 1,) while a downward push against the said finger W' will serve to instantly free the point of the cam W from contact with the arm $q$, thereby allowing the said spring P' to retract the shift-lever to its normal position (shown in full lines in Fig. 1) and restoring the parts to their normal condition.

The platen J consists of a hollow cylinder of india-rubber mounted upon a hollow cylinder X', of either wood or metal, but preferably of the former for lightness. Y is a circular base-piece formed with a vertical central tube Y', extending upwardly to a height greater than that of the said cylinder X' and platen J, said tube being externally round in cross-section and having a bore which is square in cross-section, said tube further extending below the base-piece Y a short distance, as shown at $y$, while from the upper surface of said base-piece there projects an annular flange $y'$, which may be formed with exterior screw-threads to take into or engage with the lower end of the cylinder X'.

Z is an annular plate or flat ring surrounding the annular flange $y'$ and resting on the outer circumferential portion of the base-piece Y, said ring Z having a circumferential shoulder formed by an upward vertical annular flange terminating in an outward horizontal flange, as shown at $z$, leaving thereby an annular space all around between the base-piece Y and flange $z$ for the reception of another flat ring Z', from whose periphery there projects horizontally a pin $z'$, for a purpose hereinafter described.

$A^2$ is a cap, which is the counterpart of the base-piece Y, applied in a reverse position, except that in place of a central tube it has a central hole for the tube Y' to pass through, said cap having a downward-depending annular flange $a^2$, corresponding to the flange $y'$ of the base Y, which flange on the cap is preferably exteriorly screw-threaded to take into or engage with the upper end of the cylinder X', and between the top of said cylinder and the under surface of the outer circumferential portion of the cap there is located an annular plate or flat ring $B^2$, which is the counterpart of the described lower ring Z, only applied in a reversed position, the upper ring $B^2$ having a circumferential shoulder formed by a downward vertical flange terminating in an outward horizontal flange, as shown at $b^2$, thus leaving an annular space all around between the said flange $b^2$ and cap $A^2$ for the reception of another flat ring $C^2$, which latter corresponds to the described lower flat ring $Z'$, and the two last-named flat rings are united by a vertical rod $c^2$, and in the preferred construction before both of the said flat rings are united to the ends of the rod $c^2$ there are slipped upon the latter the open annular paper clamps $D^2 D^2$. The preferred form of these clamps is best shown in Fig. 5, wherein is illustrated one of said clamps formed of a flat metallic spring-band open at one point, said band being enlarged and vertically perforated, as shown at $d^2$, to receive the rod $c^2$, (although, of course, a separate loop could be secured to the band $D^2$ for this purpose, if desired,) and at suitable intervals the said band is similarly enlarged and is vertically perforated and transversely slotted for the reception of rollers $e^2 e^2$ of any suitable number, (five being enough for effective service,) which rollers bear against the sheet of paper $E^2$, (shown by a solid black line in Fig. 5,) which is wrapped around the platen J to be type-written upon and hold the paper in place by frictional contact, one end $f^2$ of the band $D^2$ being bent inward, so as also to bear against the paper. The rod $c^2$ is stationary; but adjacent thereto there is another rod $g^2$, whose ends are journaled in the described flat rings $C^2 Z'$ and which rod is covered with a tight-fitting rubber cylinder $h^2$, which also bears against the paper $E^2$, the band $D^2$ being curved around the cylinder $h^2$, but free from contact therewith, as shown at $i^2$, beyond which point the adjacent end of the said band is bent to project outwardly, as shown at $j^2$.

In Fig. 1 I show how the platen J and its cylinder X' are secured in place between the base-piece Y and cap $A^2$, with the intermediate flat rings thereby securely clamped in position, it being preferable that there should be a collar $k^2$ near the upper end of the tube Y', against which collar the under surface of the cap $A^2$ abuts, the upper end of said tube passing through a central opening in the upper cross-bar K' of the platen-supporting slide H' I', while the described lower end $y$ of said tube Y' is seated in a central opening in the lower cross-bar J' of said slide. The upper end of the tube Y' is preferably formed with screw-threads on its outer surface for the ready attachment thereto (after the parts have been put together as shown and described) of a hand-wheel $F^2$ for the more convenient manipulation of the platen, as hereinafter described.

$G^2$ is an obliquely-disposed horizontal arm projecting inwardly from the left-hand standard H toward the platen J and provided at its inner end with a downwardly-projecting pin $m^2$ for engagement at the proper time with the horizontally-extending pin $z'$ on the periphery of the lower flat ring $Z'$ of the platen when the paper is to be fed on said platen, as hereinafter set forth.

$H^2$ represents the platen-raising lever, connected at its front end to the platen-raising key F and terminating at its rear end in an enlarged hub $n^2$, whereby it is mounted on the transverse shaft B' at the rear end of the machine, next to the hub or enlarged rear end $d'$ of the lever D', there being an upward-curved bend $o^2$ near its rear end to enable said lever $H^2$ to pass over and operate free from contact with the shaft $K^2$ of the ribbon-reversing mechanism, hereinafter described. $I^2$ is a flat spring secured at its front end to said lever $H^2$ and with its free rear end resting on the upper surface of the base of the frame A of the machine. $J^2$ represents the margin-key lever, connected at its front end to the margin-key G and extending backward substantially in horizontal line with and just beyond or on a line inside of the said lever $H^2$. The lever $J^2$ terminates at its rear end in an enlarged hub $p^2$, whereby it is mounted on the aforesaid rear transverse shaft B', between the hub $n^2$ of lever $H^2$ and the adjacent lug A', and is, furthermore, formed with an upward-curved bend $q^2$ near its rear end, like lever $H^2$, (there being also a like upward-curved bend $r^2$ in lever D' at this point,) to enable all these levers to pass over and escape contact with the aforesaid shaft $K^2$. $L^2$ is a flat spring (similar to the just-described spring $I^2$) secured at its front end to said lever $J^2$ and with its free rear end resting on the upper surface of the base A, exactly like said spring $I^2$. The lever $J^2$ is further provided with a lug $s^2$, projecting from its upper surface and transversely bored to form a bearing for a rod $M^2$, hereinafter described, the adjacent projecting end of said rod resting on top of the platen-raising lever $H^2$.

Referring now especially to Figs. 3, 4, 5, 6, and 7, I will next describe certain details of the line-spacing mechanism. The side bar I' of the vertical platen-supporting slide, which moves in the slot $i$ of standard I, is provided on its outer transverse edge with a series of notches formed by teeth $t^2 t^2 t^2$, projecting beyond the edge of said standard I. $N^2 O^2$ represent the arms of an L-shaped lever, the arm $O^2$ of which is perforated and journaled on a pivot-bolt $u^2$, which is screwed into a lug $v^2$ on the rear of the standard I, this arm $O^2$ terminating in a reduced end $w^2$, which normally rests on the upper end of an adjustingscrew $x^2$, which projects vertically through the screw-threaded bore of a lug $y^2$ on said standard I. At about the angle of the two arms $O^2 N^2$ of this lever there is a perforated lug $z^2$, from which a spring $P^2$ extends to a pin or lug $a^3$ on the standard I. The arm $N^2$ of this lever is provided with a pin or stop $b^3$. These two arms $N^2 O^2$ are laterally or horizontally disposed. $Q^2 R^2$ represent, respectively, the upright and lateral arms of another L-shaped lever pivotally secured at about the junction of the said two arms thereof to the arm $N^2$ of the first-named lever, the pivot in question being the properly-shouldered shank $c^3$ of a finger $S^2$, the said lever $Q^2 R^2$ having a heel $d^3$, which comes normally against the hereinbefore-named pin or stop $b^3$, while to the outer end of the lateral arm $R^2$ of said lever there is connected the upper end of a link $T^2$, whose lower end is pivotally connected to the hereinbefore-named platen-raising lever $H^2$, as shown at $e^3$ in Fig. 4. $U^2$ represents the head of a cam, having a suitable lever-handle $f^3$, said cam being pivotally secured to the said lever $Q^2 R^2$ by means of the properly-shouldered shank of a pivot-bolt $g^3$. The lever-arm $Q^2$ has a lug $h^3$ projecting therefrom, to which is secured the upper end of a curved flat spring $V^2$, whose free lower end bears against the head of the cam $U^2$. The upper end of the lever-arm $Q^2$ terminates on one side in an inwardly-bent stationary dog $i^3$, which in the position of the parts shown in the drawings is understood as being in engagement with one of the notches or teeth $t^2$ on the side bar $I'$ of the platen-supporting slide. $W^2$ is a sliding plate having a vertical slot $k^3$ therein, through which slot there pass the shanks of headed screws $m^3 m^3$ into the lever-arm $Q^2$, so that said plate has free vertical movement between the heads of said screws and the outer face of said lever-arm, the said slide $W^2$ resting, when it drops by its own gravity, on the head of the cam $U^2$ and the upper end of said slide terminating in another inwardly-bent dog $j^3$ of like shape with the described dog $i^3$ and disposed at the right-hand side thereof, so that when the lever $Q^2 R^2$ is pulled to the left by the link $T^2$ and lever $H^2$, as hereinafter explained, the dog $i^3$ will be laterally freed from engagement with a notch or tooth $t^2$ of the slide side bar $I'$ and the dog $j^3$ be brought into engagement with the same notch or tooth.

Referring now particularly to the detail views Figs. 8, 9, and 10 and also to Figs. 2 and 3, I will next describe certain details of the letter-spacing mechanism. $X^2$ is a cross-piece which connects the two standards H I at some little distance above their lower ends, and the mechanism about to be described is mainly situated adjacent to the left hand standard below this cross-piece, the said cross-piece being provided with a central vertically-perforated hub $n^3$ to form a bearing for the hereinafter-described vertical shaft, which serves to revolve the platen. $Y^2$ is a vertical plate projecting inwardly from the standard H just beneath the cross-piece $X^2$, to which it may be cast or secured, as shown best in the detail view Fig. 9. $Z^2$ is a horizontal plate or table projecting from the rear of the standard H at a plane below the bottom of the plate $Y^2$ and extending inward at a right angle, said table having a downward-depending vertical flange or web $o^3$ along its inner edge and an arm $p^3$ projecting horizontally from its outer edge and thence extending vertically and terminating in a perforated bearing $q^3$ for a push-rod $A^3$, which latter is provided with a notch $w^6$ therein to engage with a latch $x^6$ secured by pivot $y^6$ to said arm $p^3$, as hereinafter described.

$B^3$ represents a stop-arm the lower end of which is rigidly fastened to a shaft $r^3$, journaled in the lower inner corner of the described plate $Y^2$, to the other end of which shaft, beyond said plate, there is rigidly secured a fork $C^3$, which straddles a pin $D^3$, projecting from a sliding plate $E^3$, which has longitudinal movement on the table $Z^2$ by reason of a slot $s^3$ in said plate and the shanks of headed screws $t^3 t^3$, passed through said slot into said table $Z^2$.

$F^3$ represents a segment having a hub $u^3$ cast rigidly on one side thereof, said segment being pivoted to the flange $o^3$ of the table $z^2$ by a pivot $v^3$. The upper end of this segment is formed with a fork $w^3$, which straddles the described pin $D^3$ just back of the fork $C^3$, and the lower rounded edge of said segment is provided with two notches or indentations $x^3 y^3$ for engagement at the proper time, as hereinafter explained, with a dog $z^3$ near the free outer end of a flat spring $G^3$, whose inner end is secured to a lug $a^4$, projecting from the standard H. Further, the said segment $F^3$ is provided with two shouldered pins $b^4 c^4$ for engagement with the loops $d^4 e^4$, respectively, of the links $H^3 I^3$, as hereinafter explained.

$J^3$ is an angle-block whose lower horizontal part rests on the inner end of the described sliding plate $E^3$, to which it is pivotally secured by screw-bolt $f^4$, while the upper vertical part has a rearward-projecting lug $g^4$, to which is secured one end of a retracting-spring $K^3$, whose other end is secured to a lug $h^4$, projecting rearwardly and upwardly from the slide $E^3$. The outer end of this lug $h^4$ is transversely perforated to admit the passage therethrough of the hereinbefore-named push-rod $A^3$. Just back of the angle-block $J^3$ there is a vertical lug or stop $i^4$ on the upper surface of the slide $E^3$, at the inner rear corner thereof.

$L^3$ is a lever which is pivotally secured to the vertical upper arm of the angle-block $J^3$ by pivot-bolt $j^4$, said lever terminating at its forward end in a stationary dog $k^4$, bent at a right angle to the length of said lever and of about half the width thereof. The other end $m^4$ of said lever is adapted to be engaged by the inner end of the described push-rod $A^3$.

$M^3$ is a sliding plate having a longitudinal slot $n^4$ therein, whereby it is secured to said lever L³ by the shanks of headed screws $o^4$ $o^4$, passing therethrough into the lever, and said plate terminates at its forward end in a like bent dog $p^4$ of the same width and projection as that of the described stationary dog $k^4$ on the lever L³. The said lever is further formed with a downward extension $q^4$, from which there projects a lug $r^4$, and to this lug there is secured the lower end of a flat spring $s^4$, whose upper free end bears against the rear end of the said sliding plate M³.

N³ is a headed pin projecting from the lever L³, and from said pin the link H³ is suspended by means of a ring or eye $t^4$ at the upper end $u^4$ of said link above and at a right angle to the loop $d^4$ in said link H³.

Referring especially to Figs. 1, 2, and 3 and incidentally to Figs. 9 and 10, O³ represents a horizontally-disposed wheel having a notched or toothed periphery for engagement with the just-described dogs $k^4$ $p^4$ on the lever L³ and its sliding plate M³. The wheel O³ is mounted near the lower end of a vertical shaft P³ and rigidly secured to said shaft, which latter has a cylindrical lower end passing through the central vertical bore $n^3$ in the hereinbefore-named cross-piece X², there being a collar $v^4$ rigidly secured to said shaft just above the said cross-piece X², on which the said collar rests, and above this collar the said vertical shaft P³ is square in cross-section, so as to fit within the square bore in the vertical central tube Y' of the platen J. The wheel O³ has a hub $w^4$ on its under side, and below this there is a pulley Q³, rigidly secured to the extreme lower end of said shaft P³. In the drawings the pulley Q³ is represented as having a concave or V-shaped groove in its periphery for the reception of a triangular belt R³, passing around a like groove in the periphery of another and larger pulley S³ at the rear of the pulley Q³, as hereinafter described; but it is obvious that, if desired, the said two pulleys may be belted together in any other way, as by a sprocket-chain engaging with sprockets on their peripheries, or they may be connected by a train of gear-wheels instead of by the friction-belt shown.

T³ is a wheel horizontally mounted on the shaft P³, the hub $x^4$ of said wheel coming just below the cross-piece X² and the rim $y^4$ of said wheel being of greater thickness than that of the web of the wheel and square in cross-section, as shown in Figs. 1 and 9, so as to best provide for the attachment to said rim of the margin-regulator U³, consisting of upper and lower plates with opposed recesses in their rear ends to embrace the said wheel-rim $y^4$ and a clamping-screw $z^4$ to draw these two plates together and secure them tightly to the rim at any required point on said wheel-rim, according to the width of margin desired to be maintained on the left-hand side of the sheet type-written upon, this being accomplished by the stoppage of said margin-regulator by the stop-arm B³ at the proper time, as hereinafter explained.

V³ represents a lever whose rear end terminates in an enlarged hub $a^5$, loosely mounted on the hereinbefore-named transverse shaft B' at the extreme rear end of the machine and whose front end is rigidly connected to the adjacent end of the rod M², whose other end is journaled in the margin-key lever J². This lever V³ is formed with an upward-curved bend $b^5$ (best shown in Fig. 3) to enable it to pass over and escape contact with the hereinbefore-named shaft K², and said lever is supported near its forward end by the link I³ from pin $c^4$ on segment F³, as shown in Figs. 3 and 9.

W³ represents a lever whose rear end terminates in an enlarged hub $c^5$, mounted on the transverse shaft B', next to the hub $a^5$ of lever V³; but unlike that this hub $c^5$ is rigidly secured to said transverse shaft, so that lever W³ will move with the levers C' D' whenever a type-key C (or the spacer-bar D) is depressed. The said lever W³ is formed with an upward-curved bend $d^5$ (best shown in Fig. 1) to enable it to pass over the shaft K² like the lever V³, and the forward end of this lever W³ is supported by the link H³ from pin N³ on the lever L³, as best shown in Fig. 9.

X³ represents a left-hand standard, and Y³ a right-hand standard, at the rear end of the machine, said standards being connected at their tops by a transverse cross-bar Z³, said standards having outwardly-projecting feet $e^5$ $f^5$, secured to the upper surface of the bottom of the base A of the machine, as by screws or rivets $g^5$ $g^5$. A short distance above its foot $e^5$ the standard X³ has a horizontal outward-projecting arm $h^5$, provided with a vertical bore therethrough, forming a bearing for the vertical shaft N of the ribbon-spool N', already described, and, similarly, the standard Y³ is provided a corresponding short distance above its foot $f^5$ with a horizontal outward-projecting arm $i^5$, provided with a vertical bore therethrough, forming a bearing for the vertical shaft O of the other ribbon-spool O'. The described transverse shaft K² passes through holes or bearings in said standards X³ Y³ about midway between the said feet and outward-projecting arms, which latter form a casing or housing for the outer vertical miter-wheels $j^5$ $k^5$ on the shaft K² and for the horizontal miter-wheels $n^5$ $o^5$ on the lower projecting ends of the vertical shafts N O. The transverse shaft K² is provided with a head $m^5$ to facilitate moving said shaft in or out to enable its vertical miter-wheels to engage with one or the other of the adjacent horizontal miter-wheels, as hereinafter described. The said shafts N O are kept at their proper elevation by means of collars $p^5$ $q^5$, secured to them and resting upon the rearward-extending arms L M.

A⁴ represents another cross-bar connecting the just-described rear standards X³ Y³ in line with and below the cross-bar Z³ about midway of the height of said standards. The upper cross-bar Z³ is provided with a central vertically-perforated hub $r^5$, and the lower cross-bar $A^4$ is similarly provided with a central vertically-perforated hub $s^5$, both forming bearings for a vertical shaft $B^4$. $C^4$ is a hand-wheel on the projecting top end of this shaft $B^4$, just below which there is a ratchet-wheel $D^4$, which latter is rigidly secured to said shaft just above the cross-bar $Z^3$.

$E^4$ is a horizontally-disposed escapement, which is pivoted, as shown at $t^5$, to the cross-bar $Z^3$ and held in engagement with the teeth of the ratchet-wheel $D^4$ by a spring $F^4$, secured to said cross-bar, the lever of said escapement being marked $u^5$.

$G^4$ is a horizontally-arranged hollow or shell pulley within which is contained a volute spring $H^4$, properly secured at its ends within the shell of the pulley and covered with a top or casing $y^5$, as shown in Fig. 1, said top or casing being removed or broken away in Fig. 2 to show the said spring $H^4$. The periphery of this pulley $G^4$ is grooved to hold the cord $I^4$ as it is wound thereon, one end of said cord being secured to the said pulley, as shown at $v^5$, Fig. 1, and said cord $I^4$ thence passing obliquely to and under a pulley $J^4$, secured to a stud $w^5$ on the forward obliquely-projecting end of a V-shaped lug $K^4$, extending from the left-hand standard H. From this pulley $J^4$ the said cord $I^4$ extends vertically upward to, over, and around a pulley $L^4$, mounted on an inward-projecting stud $x^5$ on a curved lug $M^4$, projecting from the top of the standard H above the yoke-shaped cross-piece K, while the pulley $J^4$ is located on a horizontal line just above that of the shell-pulley $G^4$. The cord $I^4$ after passing up over the upper pulley $L^4$ from the rear side thereof continues down on the front side of said pulley to a lug $N^4$ on the left-hand end of the lower cross-bar $J'$ of the platen-supporting slide and is there secured, as best shown in Fig. 3.

Just below the described shell-pulley $G^4$ the vertical shaft $B^4$ is provided with another ratchet-wheel $O^4$, whose hub $z^5$ abuts against the under side of the depending hub of said shell-pulley $G^4$ and is fastened to the said vertical shaft. From the under side of the just-named shell-pulley there depends a lug or arm $a^6$, which is rigidly connected to said pulley, and to the lower end of this arm there is secured by pivot-bolt $b^6$ a dog or pawl $P^4$, whose free end engages with the teeth of the ratchet-wheel $O^4$. A vertical pin $c^6$ rises from the upper surface of said dog or pawl $P^4$, and a flat spring $d^6$ projects from the said arm $a^6$ and bears against said pin to keep it against said ratchet-wheel $O^4$. The said shaft $B^4$ is further provided with a collar $e^6$, rigidly secured thereto and resting on the hub $s^5$ of the cross-bar $A^4$, and just below said cross-bar is located the hereinbefore-named horizontally-arranged pulley $S^3$. This is also a hollow or shell pulley with a top casing $f^6$, and it contains another volute spring $Q^4$, secured therein, so as to operate in exactly the reverse direction from the spring $H^4$ in the shell-pulley $G^4$ above. I have already described the peripheral groove in this shell-pulley $S^3$ and the belt $R^3$, traveling therein and around pulley $Q^3$. The lower side of the pulley $S^3$ is formed rigidly with a depending hub $g^6$, terminating in a horizontal miter gear-wheel $h^6$, which is adapted to mesh with one or the other of the opposing vertical miter-wheels $i^6$ $j^6$ on the transverse shaft $K^2$, according as the latter is drawn out or pushed in, as hereinafter explained.

$R^4$ represents a collar at the extreme lower end of the shaft $B^4$, whose function is to keep the pulley $S^3$ and its miter gear-wheel $h^6$ in proper position on said shaft.

With respect to the two shell-pulleys and the volute springs therein contained it is to be noticed that one end of the upper volute spring $H^4$ is secured to the pulley $G^4$ (preferably to the inner end of the pivot-bolt $v^5$, whose outer end secures the adjacent end of the cord $I^4$, as already described) and that the other end of this spring $H^4$ is secured to the hub $r^5$ of the cross-bar $Z^3$, as shown at $k^6$, and hence that said upper volute spring is free from contact with the vertical shaft $B^4$, while one end of the lower volute spring $Q^4$ is directly attached to said shaft $B^4$, as shown at $m^6$, and its other end is secured to the pulley $S^3$, as clearly shown at $n^6$.

In Fig. 1 I have shown the bell and adjuncts and omitted the same from the other figures to avoid confusion in the drawings. $S^4$ represents a bell supported on an upright standard $o^6$, rising from an arm $T^4$, which projects inward from the left-hand side piece of the frame or casing of the machine. $U^4$ is a post rising from the inner end of said arm, this post being shouldered and provided at its upper end with a vertical stationary spindle or journal $p^6$ to form the bearing for the hub $q^6$ of a bell-crank lever, one arm, $r^6$, of which carries a knob $s^6$ at its end to impinge against the bell $s^4$, while the other arm, $t^6$, projects in the path of a downward-projecting pin $V^4$ on the wheel $T^3$, (which I term the "stop-wheel,") said arm $t^6$ being provided with a downward bend, as shown at $u^6$, to enable it to escape contact with the hereinbefore-named margin-regulator $U^3$. $W^4$ represents a spring secured to the spindle or journal $p^6$ above said bell-crank-lever hub $q^6$ to engage with an upright pin $v^6$ on the arm $t^6$ of said lever to force the knob $s^6$ against the bell $S^4$ at the proper time.

The operation of my machine will be readily understood from the foregoing description of its construction, taken in connection with the accompanying drawings.

I will first describe the manner of securing the sheet of paper to be type-written upon to the platen J. The said sheet $E^2$ is secured vertically around said platen, as indicated in Figs. 5 and 11. First of all the platen J is raised above the plane of the ribbon $L'$, which is done as follows: The operator places his left hand on the hand-wheel $F^2$ on top of the tube Y' (so as to regulate the speed with which the platen is raised) and with his right hand presses down on the finger S², and thereby releases the dog $i^3$ from contact with the engaging notch or tooth $t^2$ of the side bar I' of the platen-supporting slide, when the said slide will be automatically raised by the action of the spring H⁴ within the shell-pulley G⁴, said spring causing said pulley to rapidly revolve, thereby winding the cord I⁴ around its periphery and raising the platen. When the platen is raised to the proper height, the operator withdraws his hand from the said finger S², when the spring P² draws the lever-arm Q² inward on its pivot-bolt $u^2$ and causes the said dog $i^3$ to again engage with a notch or tooth $t^2$ and hold the platen-supporting slide in its raised position. The operator next presents the right-hand vertical edge of the sheet of paper E² against the platen J back of the outwardly-projecting ends $j^2$ of the described open annular paper-clamps D² D², holding the sheet E² in his left hand, and with his right hand revolves the platen by means of the hand-wheel F² just named, the said clamps D² D² being adjusted at the proper distance apart, according to the height of the sheet of paper, these clamps being held in any adjusted position (to which they have been moved on the vertical rod $c^2$ by hand) by frictional contact of the spring-bands of said clamps and their rollers $e^2$ $e^2$ against the platen and the said sheet of paper thereon. As the platen is thus revolved by the hand-wheel F² on the tube Y', which incloses the square vertical shaft P³, the said sheet of paper is next engaged by the described vertical rubber cylinder $h^2$, which thus acts as a feed-roller and draws the paper in around the platen, between the latter and the said rollers $e^2$ $e^2$ on the clamps D² D², until the said sheet E² is firmly secured in place with the other ends $f^2$ of said clamps D² bearing also on the said sheet, as shown in Fig. 5. The platen J, with the paper in proper position thereon, is then pushed downward by pressure on the said hand-wheel F² to the proper position, so that the upper part of the sheet, on which the first line is to be type-written, will be in line with the ribbon L'. The type-keys C are struck in the ordinary way, and as each key C is depressed (against the force of its retracting-spring V') it carries down with it the forward end of its lever T, whose rear end is pivoted on the transverse shaft G', and this downward movement of the key-lever T draws down its link T', and as the other end of said link is pivoted to the oblique foot $u$ of the corresponding type-bar U (pivoted on the arc-shaped rod P) the free upper end of said type-bar is thereby thrown over toward the platen, and the character-bearing plate U' on said end of the type-bar is thus carried between the front pair of tongues of the ribbon-holder M' and against the ribbon L', thereby forcing said ribbon and ribbon-holder against the sheet of paper on said platen, (against the force of the spring $k$ of the said ribbon-holder,) making the desired impression. As the operator's finger is removed from the type-key just struck the retracting-spring V' carries the key-lever T back to its normal position, and the retracting-spring $k$ performs a like office for the ribbon-holder M'. The shift when the upper character on the plate U' of the type-bar is to be impressed is accomplished as follows: The operator with his left hand depresses the shift-key E, which depresses the forward end of the shift-key lever S' on the left-hand side of the machine, whose rear end is rigidly secured to the transverse shaft G', as already described, and this movement draws down the link R' and the short arm $q$ of the shift-lever Q $q$ on said left-hand side of the machine, and the same action takes place with the lever S, rigidly secured at its rear end to said shaft G' on the right-hand side of the machine, and consequently this draws down the link R' and short arm of the shift-lever on said right-hand side simultaneously, thus throwing both shift-levers Q $q$ Q $q$ and their posts Q' into the position shown (for the left-hand set) in dotted lines in Fig. 1 against the force of the spring P'. The arc-shaped rod P, being carried by the long arms Q of the shift-levers, when thus thrown back gives a different center to the arc of the circle through which the character-plate U' of each type-bar U moves in making the impression against the platen from that occupied before making the shift, and hence when the parts have been shifted, as described, the upper part of said plate U' will strike against the ribbon, and in order that the face of the type or character may always strike squarely, as the platen has a vertical face in my machine, I have slanted the upper and lower characters on the plate U' in opposite directions, as already set forth, and I have already described how the shift-lever may be locked to continue the use of the upper characters exclusively when desired and how the retracting-spring P' will restore the parts to normal position after unlocking the same or after shifting a type-bar when the shift-levers are not locked. The spacer-bar levers E' F', as stated, are pivotally attached to the transverse shaft G' at their rear ends like the key-levers T, and the operation of all of these levers E' F' and C C C, &c., is exactly the same. All of these levers rest upon the cross-bar $b'$, whose ends are connected to the abruptly-rising forward ends of the described levers C' D'. Now as either the spacer-bar D or one of the type-keys C is depressed this action (through the levers of the spacer-bar or the key-lever) depresses the said cross-bar $b'$, whose levers C' D' are rigidly secured at their rear ends to the rear transverse shaft B', and thus partly revolves said shaft B', thus depressing the forward end of the lever W³, whose rear end is rigidly secured to said shaft B', as already described, said lever W³ being supported by the link H³, as best shown in Fig. 9, and said link being connected by its loop $d^4$ to a pin $b^4$ on the segment $F^3$, while the upper end of said link is secured to a pin $N^3$ on the dog-lever $L^3$, as already described, and the result of this depression of the forward end of the said lever $W^3$ is to pull down (through said link $H^3$) on said dog-lever $L^3$, bringing the stationary dog $k^4$ on said lever down out of contact with the toothed or notched horizontal wheel $O^3$, which is fast on the shaft $P^3$ of the platen (which stationary dog $k^4$ held said wheel $O^3$ stationary) and drawing the dog $p^4$ on the sliding plate $M^3$ on said lever $L^3$ into contact with said wheel $O^3$. The moment the stationary dog $k^4$ is released from contact with the notched periphery of the wheel $O^3$ and its place taken by the dog $p^4$ on the sliding plate $M^3$ the force of the volute spring $Q^4$ within the shell-pulley $S^3$ will partly revolve the said pulley $S^3$, and the belt $R^3$ in the peripheral groove of pulley $S^3$ will partly revolve the pulley $Q^3$, rigidly secured to the lower end of the shaft $P^3$, until the sliding plate reaches the limit of its movement on the lever $L^3$, which is a distance equal to just one notch on the periphery of the said horizontal wheel $O^3$, when the wheel $O^3$ is again brought to a standstill, but meanwhile in the just-described movement of the pulley $Q^3$ the attached squared shaft $P^3$ has been partly revolved a corresponding distance, thereby carrying the platen J around to present on the sheet $E^2$ the space required for the impression of one character on the plate $U'$ of the type-bar U. The moment the operator's finger is removed from the type-key (or spacer-bar) after depressing the same the retracting-springs $V'$ or $h'$ (as well as the retracting-springs $j'$ of the levers $C'$ $D'$) will restore the various levers to their normal positions and turn the transverse shaft $B'$ back to its former position, thereby raising the lever $W^3$, freeing the dog $p^4$ from and restoring the stationary dog $k^4$ to engagement with the notched wheel $O^3$, the said dog $k^4$ now occupying, of course, the next notch ahead of that which it occupied before the wheel $O^3$ was moved by the movable dog $p^4$, and the latter on its release is moved forward to its former position by the action of the spring $s^4$ against the rear end of the sliding plate $M^3$. When the first line of type-writing is nearly completed across the sheet $E^2$, the bell $S^4$ gives warning by reason of the contact of the pin $V^4$, which is on the under side of the stop-wheel $T^3$, with the adjacent arm $t^6$ of the bell-crank lever, followed immediately by the action of the spring $W^4$ against the pin $v^6$ on said arm, when the pin $V^4$ has moved past the said arm $t^6$, and when the type-written line is completed—say with from seven to ten impressions or impacts of type-keys after the bell has sounded, according to the location of the pin $V^4$ on the stop-wheel $T^3$—or as soon after the bell has sounded as is desired within said limits the operator presses the margin-key G, which depresses the lever $J^2$, and, through the rod $M^2$, secured to said lever and also secured to the lever $V^3$, also depresses said lever $V^3$, thereby, through link $I^3$ and its loop $e^4$ and pin $c^4$ on segment $F^3$, drawing down the left-hand side of said segment, which latter moves on its pivot $v^3$, and by reason of the segment-fork $w^5$, which straddles the pin $D^3$, projecting from the sliding plate $E^3$ on the table $Z^2$, this movement of said segment $F^3$, pin $D^3$, and sliding plate $E^3$ serves to retract the lever $L^3$, connected to said sliding plate, and thus draws the dog on the end of said lever laterally away from engagement with the notched or toothed wheel $O^3$. This same movement of the pin $D^3$ carries the fork $C^3$ back toward the standard H of the machine, and as this fork $C^3$ is rigid with shaft $r^3$ of the stop-arm $B^3$ the said stop-arm $B^3$ is thrown forward in the path of the margin-regulator $U^3$ on the wheel $T^3$, and as the shell-pulley $S^3$ is now no longer held from revolution by the described engagement of one of the dogs on lever $L^3$ and the teeth or notches on wheel $O^3$ the spring $Q^4$ within said pulley $S^3$ is free to revolve the latter, and this, through the belt $R^3$ and pulley $Q^3$, revolves the shaft $P^3$ and with it the stop-wheel $T^3$, rigidly secured to said shaft $P^3$, until the margin-regulator $U^3$ encounters the said stop-arm $B^3$.

The described depression of the margin-key G not only accomplishes the just-described results, but, further, when the described rod $M^2$ is depressed by such action the end of said rod which projects over the platen-raising lever $H^2$ depresses said lever $H^2$ and draws down on the link $T^2$, and this link pulls down the outer end of the lateral arm $R^2$ of the L-shaped lever $Q^2$ $R^2$, (see Figs. 6 and 7,) and as said lever is thus tilted on its pivot $c^3$ the stationary dog $i^3$ is moved laterally out of its engagement with a tooth or notch $t^2$ on the side bar $I'$, and the dog $j^3$ on the sliding plate $W^2$ is brought into engagement with that same tooth or notch, whereupon the action of the spring $H^4$ revolves the pulley $G^4$, winding up the cord $I^4$ in the grooved periphery of said pulley, and thus raising the plate J. This upward movement of the platen is checked when the lower end wall of the slot $k^3$ in the sliding plate $W^2$ encounters the shank of the lower headed pin $m^3$, the cam-head $U^2$ in the device as adjusted in Fig. 7 being arranged to permit the upward movement of the platen for the space of only one notch or tooth, and hence for a "single-line" elevation of the paper fast on said platen; but if the lever-handle $f^3$ of said cam be depressed then the cam-head $U^2$ will be turned so that the movement of the sliding plate $W^2$ and the dog $j^3$ will be equal in height to that of two adjacent teeth or notches $t^2$, and then the platen and its paper will be raised a double or "two-line" distance. The moment the operator removes his finger from the margin-key G the lever $H^2$ is raised by means of its spring $L^2$, and as the link $T^2$ is stiff this link raises the outer end of said arm $R^2$ back to its normal horizontal position and throws arm $Q^2$ back from a tilted to its normal vertical position, thereby pushing the sliding-plate dog $j^3$ laterally out of engagement with the notch or tooth it has just occupied or engaged with and pushing the stationary dog $i^3$ into engagement with the next lower notch or tooth if the cam-head $U^2$ is set for a single tooth and line adjustment or the second lower notch or tooth if the cam-head is set for a double-tooth or two-line adjustment. In the previously-described movement of the segment $F^3$ (when the margin-key G was depressed) said segment was tilted over to the left and that side brought down by the link $I^3$, the upper end of the loop $e^4$ of said link being in engagement with the pin $c^4$ and the segment held in this position by engagement of the dog $z^3$ on spring $G^3$ with the left-hand notch $x^3$ in said segment. At the same time this tilting of the segment $F^3$ has resulted in raising the pin $b^4$ up to the upper end of the loop $d^4$ of link $H^3$, and when the margin-key G is released and the lever $H^2$ is raised by its spring $L^2$, all as stated, the rod $M^2$ is also raised by lever $H^2$ and with it the lever $V^3$, fast on the other end of said rod $M^2$, and this upward movement of the lever $V^3$ raises the link $I^3$, the lower end of the loop $e^4$ being now in contact with the pin $c^4$, the relative positions of loop $d^4$ and pin $b^4$ being unchanged from the last-described relations. The effect of the foregoing-described movements consequent upon the depression and subsequent release of the margin-key G is practically to revolve and raise the platen, so as to carry the paper fast thereon around to the point where the next line is to be started, so that the paper on the platen is in position to receive the impact of the first letter or character on said new line. The first type-key C struck (or first striking of the spacer-bar D if that is to be now first used) will depress cross-bar $b'$ and levers $C'$ $D'$, turning the rear transverse shaft $B'$, and hence depressing the forward end of lever $W^3$, (whose hub $c^5$ is rigidly secured to said shaft $B'$,) which draws down on link $H^3$, and thereby (as the top of the loop $d^4$ of said link is now against the pin $b^4$) drawing down the elevated right-hand end of segment $F^3$, whose fork $w^3$ moves the pin $D^3$ away from the standard H, carrying with it the slide $E^3$ and attached lever $L^3$, thus bringing the dog $p^4$ on the sliding plate $M^3$ into engagement with a notch or tooth on the wheel $O^3$, (spring $Q^4$ now being permitted to revolve pulley $S^3$, and thus move wheel $O^3$ one notch,) and this movement of the pin $D^3$ will also carry the fork $C^3$ with it away from the standard H, and thus cause the stop-arm $B^3$ to recede from the path of the margin-regulator $U^3$. This movement of the segment $F^3$ causes the left-hand side of said segment to rise, carrying the pin $c^4$ up against the top of the loop $e^4$ of link $I^3$ and also causes the dog $z^3$ on spring $G^3$ to escape from notch $x^3$ and engage with the right-hand notch $y^3$ of the segment. The moment the operator's finger is removed from the said just-struck type-key C (or spacer-bar D) the levers $C'$ $D'$ are raised by their springs $j'$, thereby revolving rear transverse shaft $B'$ back to its normal position, and thus raising lever $W^3$ to its normal position, and this in turn elevates link $H^3$ to its normal position, with the lower end of its loop $d^4$ against pin $b^4$, and said upward movement of lever $W^3$ and link $H^3$ also raises the adjacent end of the lever $L^3$ (on its pivot $j^4$) by reason of the pin $N^3$ on said lever and ring or eye $t^4$ at the top of the upper end $u^4$ of said link $H^3$, which elevates the dog $p^4$ on sliding plate $M^3$ above and free from the wheel $O^3$ and causes the stationary dog $k^4$ on said lever $L^3$ to engage with the notch or tooth on the wheel $O^3$ next to the one just vacated by the sliding-plate dog $p^4$, the several parts being now all in the relative positions best shown in Fig. 9.

It only remains to describe the especial function of the platen-raising key F. The platen-raising lever $H^2$ has been described, with the manner in which it was operated by the margin-key G; but it may also be operated directly by its own key F independently of the margin-key G and is to be so operated whenever the platen is to be raised a short distance without being revolved—as, for example, when it is desired to widely separate two paragraphs or leave considerable blank space intermediate of the top and bottom of the sheet being type-written. In such cases all that is done is to depress the said platen-raising key F and repeat this action until the platen is raised to the desired height, according to the required space to be left on the said sheet between the lines of type-writing. Each depression of the key F will raise the platen the space of either a line or two lines, according to the position of the described cam-head $U^2$ at the time.

When the sheet of paper is fully type-written upon or otherwise completed, it may be readily removed from the machine as follows: The operator places his left hand on the hand-wheel $F^2$ and depresses the finger $S^2$ with his other hand, so as to control the ascent of the platen, just as described hereinbefore, when putting the paper on the platen. When the latter is raised to the required height, he removes his left hand from the hand-wheel and his right hand from the finger $S^2$, and now takes hold of the hand-wheel $F^2$ with his right hand and with his left hand presses the push-rod $A^3$ against the adjacent end of the lever $L^3$, which turns said lever on its pivot $f^4$, thereby withdrawing dog $k^4$ from engagement with the teeth or notches of wheel $O^3$, and in order to prevent the lever being drawn back by the spring $K^3$, so that the dog would again engage, the hereinbefore-named pivoted latch $x^6$ is dropped into the notch $w^6$ in said push-rod $A^3$. When these parts are thus held against movement, the operator begins to turn the platen J in the opposite direction from that employed in feeding the sheet of paper to said platen, and as said sheet begins to emerge from its position between the platen and the open annular paper-clamps $D^2$ $D^2$ he grasps said sheet with his left hand, meanwhile continuing to turn the hand-wheel $F^2$ and platen with his right hand, and thus quickly completes the said removal. As soon as the paper is removed the push-rod $A^3$ must be freed from the latch $x^6$, so that the dog $k^4$ may be again thrown into engagement with the notched or toothed periphery of the wheel $O^3$.

One great advantage of my machine is the fact that the platen is always revolved in one direction, and hence there is no time lost in carrying the platen back from the end of one line to the beginning of the next, as in the case of the ordinary machines with horizontally-disposed platens.

Having thus described my invention, what I claim as new, and desire to secure by Letters Patent, is—

1. In a type-writing machine, the combination of a vertically-disposed horizontally-rotatable platen, type-bars, type-bar-actuating mechanism, and mechanism for rotating said platen, actuated by the actuation of said type-bar-actuating mechanism, substantially as described.

2. In a type-writing machine, the combination of a vertically-disposed horizontally-rotatable platen, type-bars, type-bar-actuating mechanism, a motor tending constantly to rotate said platen, and mechanism actuated by the actuation of said type-bar-actuating mechanism for permitting the rotation of said platen by said motor, substantially as described.

3. In a type-writing machine, the combination of a vertically-disposed horizontally-rotatable platen, type-bars, type-bar-actuating mechanism, a spring tending constantly to rotate said platen, mechanism actuated by the actuation of said type-bar-actuating mechanism for permitting the rotation of said platen by said spring, substantially as described.

4. In a type-writing machine, the combination of a vertically-disposed horizontally-rotatable platen, type-bars, type-bar-actuating mechanism, mechanism actuated by the actuation of said type-bar-actuating mechanism for rotating said platen, and mechanism for raising said platen and rotating the same the required distance to provide the necessary margin, substantially as described.

5. In a type-writing machine, the combination of a vertically-disposed horizontally-rotatable platen, type-bars, type-bar-actuating mechanism, a spring acting constantly to rotate said platen, mechanism actuated by the actuation of said type-bar-actuating mechanism for permitting the rotation of said platen by said spring, a spring acting constantly to move said platen longitudinally, and mechanism for permitting the longitudinal movement of said platen by said spring, substantially as described.

6. In a type-writing machine, the combination of a vertically-disposed horizontally-rotatable platen, type-bars, type-bar-actuating mechanism, mechanism for rotating said platen actuated by the actuation of said type-bar-actuating mechanism, mechanism for moving said platen longitudinally, and a lever and key for operating said last-mentioned mechanism, substantially as described.

7. In a type-writing machine, the combination with a horizontally-disposed keyboard, comprising a series of type-keys and a spacer-bar supported in a suitable frame, vertical standards rising from each side of said frame back of the keyboard connected by a yoke-shaped cross-piece and provided with suitable guides or ways, a platen-supporting slide having side bars vertically movable in said guides or ways, and upper and lower connecting cross-pieces, a vertically-arranged platen supported in said slide, vertically-disposed revolving shafts back of said platen, ribbon-spools on the upper ends of said shafts, a ribbon-holder on the said yoke-shaped cross-piece in front of the said platen, a ribbon extending from spool to spool around and in front of said platen, and through said ribbon-holder, said ribbon being vertically disposed with respect to its width, and a series of type-bars arranged in front of the platen and connected at their lower ends to the type-key levers, and with their free upper ends adapted to move toward and from the said ribbon-holder in the arc of a circle.

8. In a type-writing machine, the combination with a vertical platen, and a ribbon, of a ribbon-holder comprising a suitable support, transversely-perforated lugs projecting upward from said support, a pivot journaled in said perforated lugs, a bell-crank lever having an upper and a lower arm united by a sleeve mounted on said pivot, means for normally depressing the free outer end of said lower arm, and two pairs of tongues, or forks, projecting from said upper arm to receive the ribbon between them.

9. In a type-writing machine, the combination with the keyboard, type-keys, and key-levers, of a vertically-arranged platen, a yoke-shaped cross-piece in front of the same, a ribbon-holder pivotally secured to and rising from said cross-piece, and having two pairs of tongues or forks projecting from the upper end thereof to receive the ribbon between them, means for keeping said ribbon-holder normally away from contact with the platen, and a series of type-bars connected to said key-levers and adapted to strike against the ribbon between the forks of the ribbon-holder and carry said ribbon against the platen, with every depression of a type-key.

10. In a type-writing machine, the combination with a vertically-arranged horizontally-revolving platen, type-bars, and operating-keys therefor, of means for raising the platen, and means for regulating the ascent thereof, means for checking the said ascent, and means for lowering said platen, all at the will of the operator.

11. In a type-writing machine, the combination with a vertically-arranged horizontally-revolving platen, of a series of open annular paper-clamps carried by and rotating with the platen and having frictional contact with said platen.

12. In a type-writing machine, the combination with a vertically-arranged horizontally-revolving platen, of a series of open annular spring-bands provided with a series of rollers carried by and rotating with the platen and having frictional contact with said platen.

13. In a type-writing machine, the combination with a vertically-arranged horizontally-revolving platen, of a series of open annular paper-clamps having frictional contact with said platen carried by and rotating with said platen, and a vertical feed-roller arranged in a line parallel to that of said platen, and near the openings in the said annular paper-clamps.

14. In a type-writing machine, the combination with a vertically-arranged horizontally-revolving platen, of a series of open annular flat spring-bands surrounding said platen, and carrying a series of rollers in contact therewith and being carried by and rotated with the platen, and a vertical feed-roller arranged in a line parallel to that of said platen and near the openings in the said bands.

15. In a type-writing machine, the combination with a vertically-arranged horizontally-revolving platen having flat rings at each end thereof, of a vertical rod uniting said flat rings and stationary therein, a vertical feed-roller revolubly journaled in said flat rings, and a series of open annular slotted spring-bands surrounding said platen and movably supported on said vertical rod, and with the openings of said bands adjacent to said feed-roller, together with a series of rollers mounted in the slots of said bands and having frictional contact with said platen.

16. In a type-writing machine, the combination with a suitable frame, and a platen-supporting slide movable therein, of a vertically-disposed platen comprising a hollow cylinder with an exterior covering of india-rubber; a circular base-piece having a vertical annular flange fitting within the said hollow cylinder and a vertical central tube extending upward through and above said hollow cylinder, and below said base-piece, and said tube having a bore square in cross-section; an annular plate surrounding the said annular flange of the base-piece and resting on the circumferential portion thereof, and having an upwardly-offset outer edge; a flat ring held between the base-plate and superimposed annular plate; a cap-piece forming the counterpart of the base-piece, and provided with a central opening for the passage of the central vertical tube therethrough; an annular plate resting on the top of the platen just below the cap-piece and having a downwardly-offset outer edge; a flat ring held between the cap-piece and the last-named annular plate; a vertical shaft square in cross-section passing through the said vertical central tube, on which shaft said platen is vertically movable; a hand-wheel in the upper end of said shaft; and a series of operating-wheels on the lower projecting end of said shaft.

17. In a type-writing machine, the combination of a frame, a platen, a pair of bell-crank levers pivotally supported and connected by a bar, a series of type-bars pivoted on said bar, type-keys and connections between the same and the type-bars, a shift-key, and operative connections between the latter and said bell-crank levers, substantially as described.

18. In a type-writing machine, the combination with a horizontally-disposed keyboard and vertically-arranged platen, type-keys, key-levers, type-bars and a shift-key and shift-key levers, all properly connected together, with a suitable frame or casing therefor; of a pair of bell-crank shift-levers pivotally connected to said frame or casing, and to said levers, and means for shifting the type-bars independently of the shift-key, as well as for locking the shift-levers in their shifted position, and for releasing them from such position and restoring the parts to normal condition.

19. In a type-writing machine, the combination with a horizontally-disposed keyboard and vertically-arranged platen, and suitable supporting-frames therefor, of a pair of bell-crank shift-levers pivoted, one on each side, to the side pieces of the upper part of the frame or casing on the inner sides thereof; a shift-key on one side of the keyboard; a retracting-spring connecting the shift-lever with the side piece of the frame on that side; stops or pins projecting inwardly from the side pieces of the frame, on both sides, to limit the backward movement of the shift-levers; posts projecting obliquely forward from each shift-lever and connected by a transverse bar having right-angled ends projecting rearwardly; an arc-shaped rod connecting the upper ends of the long arms of the shift-levers; a series of type-bars pivotally arranged on said rod and having obliquely-disposed feet projecting downward and rearward beyond said rod; a transverse shaft journaled in the side pieces of the frame; key-levers connecting said transverse shaft with the type-keys of the keyboard; links connecting the feet of said type-bars to the said key-levers; a shift-key lever on one side of the frame connected at its forward end to the lower end of the shift-key and at its rear end to the said transverse shaft; another shift-key lever on the opposite side of the frame, connected at its rear end to said transverse shaft, and at its forward end pivotally connected by a link to the short arm of the bell-crank shift-lever on that side, and another link similarly connecting the other bell-crank shift-lever with the other shift-key lever.

20. In a type-writing machine, the combination with a suitable frame or casing and a bell-crank shift-lever pivotally connected thereto, and type-keys and levers, and type-bars pivotally connected together and to said shift-lever; of a retracting-spring connected to the long arm of said shift-lever and to said frame or casing; a locking-cam rigidly secured to one end of a shaft journaled in the adjacent side piece of said frame or casing above and in vertical line with the short arm of said shift-lever; and a finger rigidly secured to the other end of said shaft, said cam and finger projecting at practically right angles to each other.

21. In a type-writing machine, the combination with a horizontally-disposed keyboard and a vertically-disposed platen, and series of type-keys, key-levers, shift-key and shift-key levers; of a pair of bell-crank shift-levers; an arc-shaped rod connecting the upper ends of the long arms of said shift-levers; and a series of type-bars pivotally arranged on said rod and linked to said key-levers, the free ends of said type-bars each bearing two printing characters, slanting in opposite directions from the center of said ends, whereby, when any one of said type-bars makes impact against the platen, the character struck will always stand exactly vertical and give a direct horizontal impression, whether the said type-bar is in its normal or shifted condition.

22. In a type-writing machine, the combination with a horizontally-disposed keyboard and a vertically-disposed platen, of vertical standards on each side of said platen, said standards having vertical grooves therein, and being united, near their upper ends, by a yoke-shaped cross-piece; a platen-supporting slide, having side bars adapted to move vertically within the said grooves in the standards, and united by upper and lower cross-bars, between which the said platen is supported, and one of said side bars having a vertical series of teeth or notches; a vertically-movable shaft extending entirely through the center of said platen and through the said cross-bars, and so secured to the platen that the latter is capable of moving freely up and down on said shaft, but incapable of revolution independently of said shaft; a line-spacing mechanism having dogs in adjustable engagement with the toothed or notched side bar; and means for automatically elevating the platen and supporting-slide on the withdrawal of one of said dogs from its contact with said side bar.

23. In a type-writing machine, the combination with a horizontally-disposed keyboard, a vertically-disposed platen, and type-bars arranged to present the type vertically to the platen, of a key and connecting mechanism for raising said platen at the termination of each line, so as to continuously and successively revolve the platen in one direction only, from start to finish of the sheet being written upon, by the successive depressions of the different keys only.

24. In a type-writing machine, the combination with a horizontally-disposed keyboard, a vertically-disposed platen, and type-bars arranged to present the type vertically to the platen, of a single key and connecting mechanism, for automatically raising the platen at the termination of each line and simultaneously revolving said platen the required marginal distance for the beginning of the next line, so that said platen is continuously and successively revolved in one direction only, from start to finish of the sheet being written upon, and with each line beginning at the predetermined distance from the edge of the said sheet, by the successive depression of the different keys only.

25. In a type-writing machine, the combination with a horizontally-disposed keyboard and a vertically-disposed platen, of a margin-regulating key for automatically raising said platen and beginning each new line at a stated distance from the edge of the sheet being written upon, and adjustable means for predetermining the said distance as desired, said platen being continuously revolved in one direction only, without lateral change of position of said platen.

26. In a type-writing machine, the combination with a keyboard having type-keys and levers, and a series of type-bars and a platen-raising key, and connecting mechanism; of a vertically-disposed platen, supported on a vertically-movable frame, and movably mounted on a vertical shaft; and another vertical shaft carrying two horizontally-disposed shell-pulleys, each containing a volute spring arranged to revolve said pulleys in opposite directions, one of said shell-pulleys being geared to the lower end of the first-named vertical shaft so as to automatically revolve said platen with each depression of a type-key, and the other shell-pulley being connected by cord and pulleys to the said platen-supporting frame, so as to automatically raise said platen with each depression of the platen-raising key.

In testimony that I claim the foregoing I have hereunto set my hand, at Milwaukee, in the county of Milwaukee and State of Wisconsin, in the presence of two witnesses.

WALTER H. HANSON.

Witnesses:
N. E. OLIPHANT,
B. C. ROLOFF.